United States Patent [19]

Corey et al.

[11] 4,186,830
[45] Feb. 5, 1980

[54] ROLLER ASSEMBLY FOR PACKAGE FLOW SYSTEMS

[75] Inventors: Robert L. Corey, Chicago; Frederick E. Ullman, Glencoe, both of Ill.

[73] Assignee: Unarco Industries, Inc., Chicago, Ill.

[21] Appl. No.: 882,732

[22] Filed: Mar. 2, 1978

[51] Int. Cl.² .............................................. B65G 39/02
[52] U.S. Cl. ..................................... 193/35 R; 193/37
[58] Field of Search .......................... 193/37 R, 35 R; 308/226; 29/148.4, 110, 116 R; 211/49, 49 D

[56] References Cited

U.S. PATENT DOCUMENTS 3,023,487   3/1962   Hinckley ........................ 308/226 X
3,721,326   3/1973   Bussienne ......................... 193/37 X
3,915,275   10/1975  Specht ............................. 193/37 X Primary Examiner—Robert B. Reeves
Assistant Examiner—Gene A. Church
Attorney, Agent, or Firm—Dressler, Goldsmith, Clement, Gordon & Shore, Ltd.

[57] ABSTRACT

A roller assembly for use in a package flow system. The roller assembly has a unitary rail frame assembly with pairs of opposed arcuate shaft sections spaced along the rail frame. The arcuate shaft sections of each pair are axially spaced from each other and extend integrally from the rail frame to provide integral bearing frame surfaces for supporting one of a plurality of rollers.

15 Claims, 9 Drawing Figures

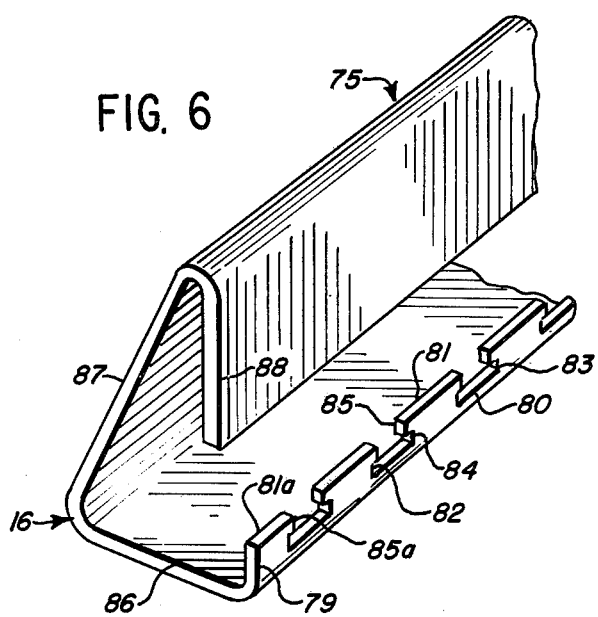
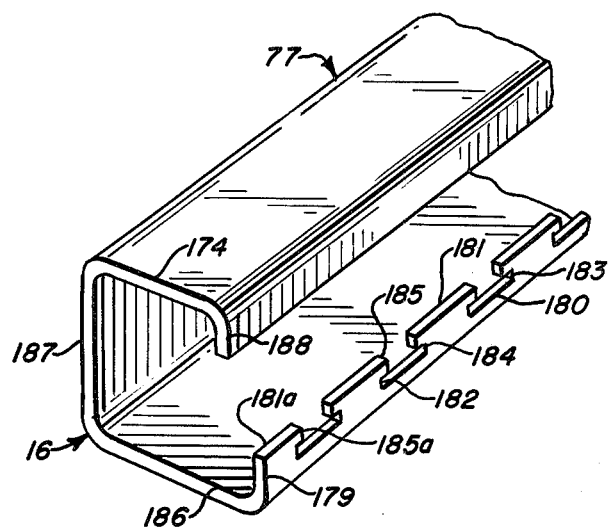
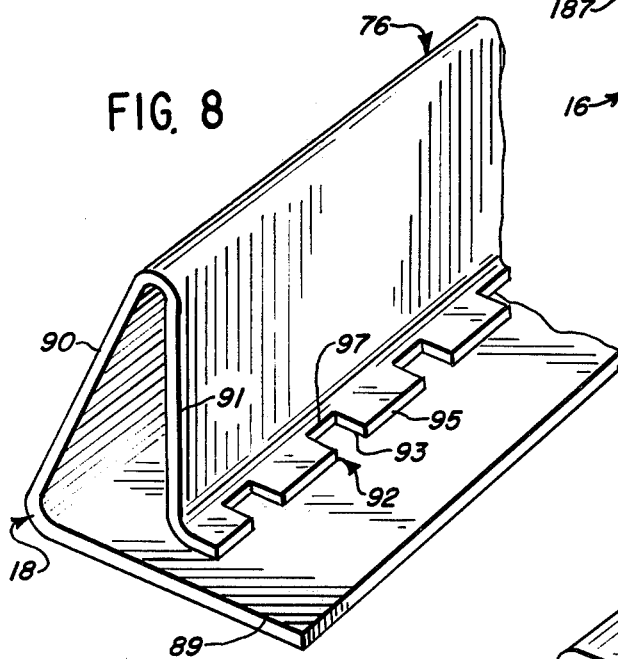
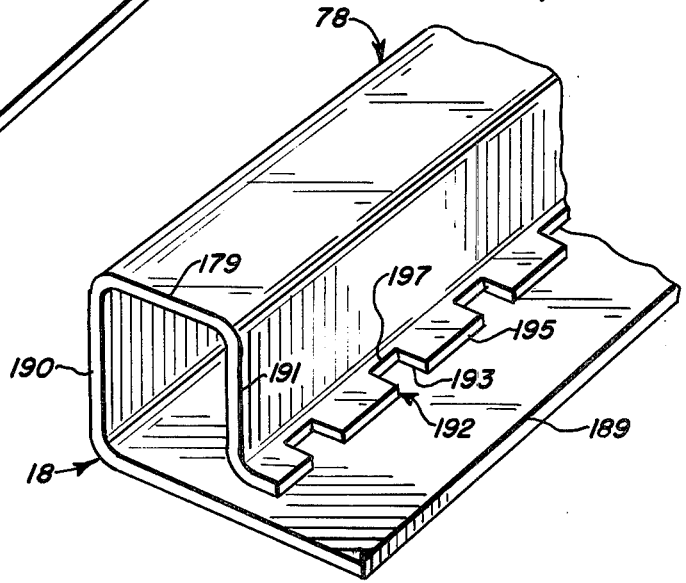

ROLLER ASSEMBLY FOR PACKAGE FLOW SYSTEMS

BACKGROUND OF THE INVENTION

This invention relates to package flow systems, and more particularly to a roller assembly for use in package flow systems.

Over the years a number of roller assemblies have been developed for conveying, supporting and storing various packages and articles upon frames, flow tracks, racks and conveyor frames. These prior art roller assemblies have met with varying degrees of success.

One type of prior art roller assembly that has been developed has one or more rollers extending laterally outward of the side walls of the flow track or rail. Undesirably, the arrangement and positioning of these rollers occupy valuable storage and conveying space.

Another type of roller assembly that has been developed has rollers mounted between the side walls of the channel-shaped flow track. Typifying this type of roller assembly are the roller assemblies shown in U.S. Pat. Nos. 2,982,387; 3,023,487; 3,063,354 and 3,900,112. These rollers have outwardly extending spindles, axles and trunnions which are connected or integrally formed with the roller and are supported by the shoulders of apertures or recesses of the flow track. Some of these roller assemblies are intricate and sometimes difficult and expensive to manufacture, assemble or install.

It is therefore desirable to provide an improved roller assembly of relatively simple construction and design which is easier and less expensive to manufacture, assemble and install.

SUMMARY OF THE INVENTION

An improved roller assembly is provided for use in a package flow system. The roller assembly is of relatively simple design and construction and is generally easy and inexpensive to manufacture, assemble and install.

In accordance with the present invention, the roller assembly has a plurality of rollers with an outer cylindrical load-supporting surface that dynamically supports a load, such as a package. Each roller also includes a hub which defines a shaft-receiving socket.

The roller assembly further includes a unitary rail frame assembly with pairs of axially spaced shaft sections that engage the sockets and rotatably support the rollers. Advantageously, the shaft sections extend integrally from upright side walls of the unitary frame assembly. An intermediate section extends between and connects the side walls. Desirably, each pair of shaft sections are in general horizontal alignment with each other.

In the preferred form each of the shaft sections is arcuate in shape with its outer surface facing generally upwardly to provide an arcuate upper bearing frame surface for each roller. Preferably, each of the shaft sections takes the shape of an inverted U as viewed laterally and extend arcuately for more than 180 degrees about a longitudinal axis. In the illustrative embodiment the arcuate shaft sections extend for about 240 degrees and is tapered slightly inwardly in a downward direction toward an opposite side wall.

Desirably, each side wall is constructed and arranged with a longitudinally reinforcement rib. Preferably, each side wall is also constructed and arranged with a generally U-shaped edge having an upwardly turned flange extending generally vertically for providing additional reinforcement for the unitary frame assembly.

A more detailed explanation of the invention is provided in the following description and appended claims taken in conjunction with the accompanying drawings.

BRIEF DESCRIPTION OF THE DRAWINGS

FIG. 6 is a fragmentary perspective view of the front shelf member illustrated in FIG. 2;

FIG. 7 is a fragmentary perspective view of a rear shelf member;

FIG. 8 is a fragmentary perspective view of the front shelf member illustrated in FIG. 3; and FIG. 9 is a fragmentary perspective view of another type of rear shelf member.

DETAILED DESCRIPTION OF THE ILLUSTRATIVE EMBODIMENT

Figures 2, 5:
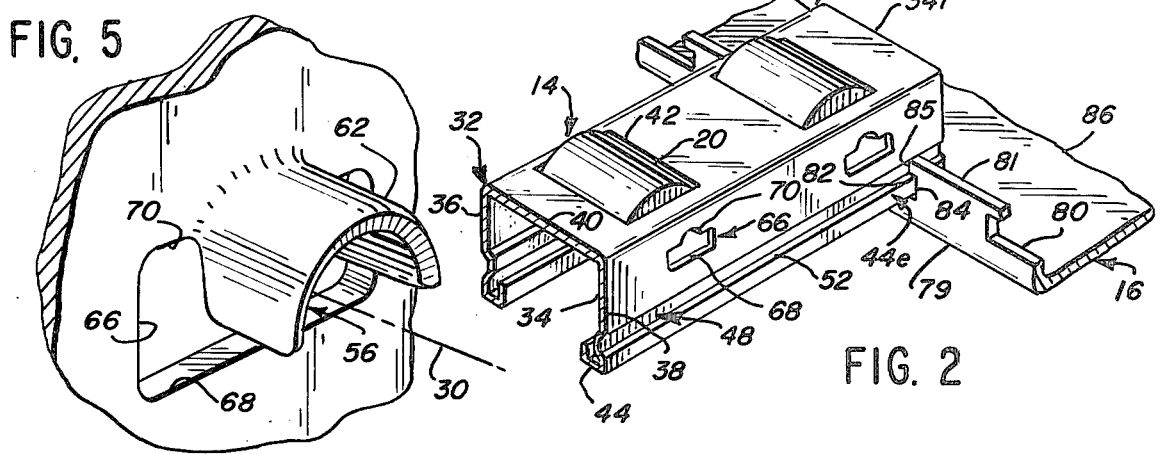
FIG. 2 is a perspective view of a package flow system with the roller assembly supported by a shelf member of a support frame.
FIG. 5 is an enlarged perspective view of an arcuate shaft section that together with a similar, axially opposed, arcuate shaft section supports a roller.
Figures 3, 4:
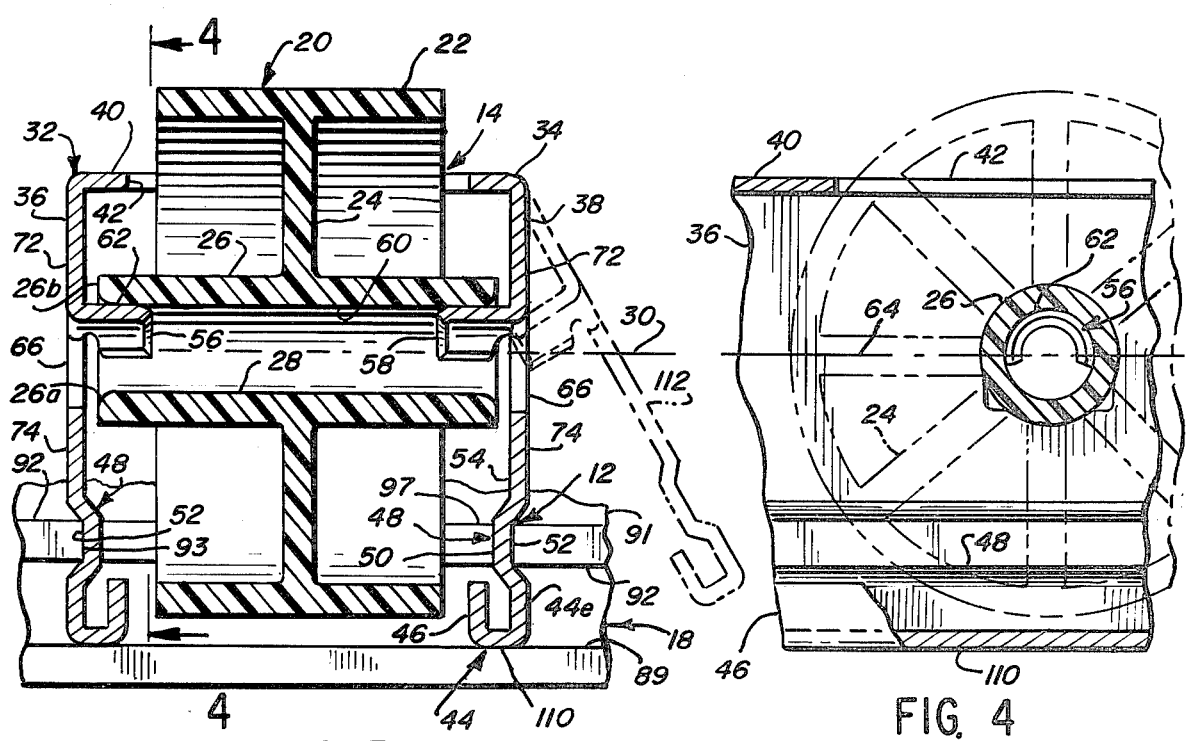
FIG. 3 is an enlarged cross-sectional end view of a package flow system with the roller assembly supported by another type of shelf member.
FIG. 4 is a fragmentary longitudinal view of the roller assembly taken substantially along lines 4—4 of FIG. 3 with parts broken away for ease of illustration and clarity.

FIGS. 2 and 3 of the drawings illustrate package flow systems 10 and 12, respectively, having an improved impact-resistant roller assembly 14 which is particularly useful for conveying, supporting and storing packages, cartons, containers and other articles upon shelve members of a support frame, rack or track assembly 16 or 18. The roller assembly 14 can also be useful in gravity conveyor systems and other conveyor assemblies.

Roller assembly 14 includes a plurality of cylindrical rollers 20 which are preferably longitudinally spaced from each other at equal intervals and made of impact-resistant plastic having a relatively low coefficient of friction, such as nylon or high density polyethylene. In some circumstances it may be desirable to make the roller 20 out of other materials, such as metal, wood or rubber.

Each roller 20 has an outer cylindrical load-supporting surface 22 (FIG. 3) for engaging, dynamically supporting and conveying a load, such as a package, carton, container or other articles. A plurality of circumferentially spaced ribs 24 extend radially inwardly from the outer load-supporting surface 22 to a centrally disposed tubular hub 26. In the illustrative embodiment there are two sets of four circumferentially spaced ribs 24 which are laterally and angularly offset from each other.

Hub 26 defines an elongated, axial shaft sections-receiving socket 28 extending along a lateral axis 30. Socket 28 provides a cylindrical bearing surface for the shaft sections 56 and 58. The outer lateral edges or ends 26a of the hub 26 are also rounded or chamfered radially inwardly for ease of insertion of the shaft sections 56 and 58. Desirably, the outermost portion 26b of the outer lateral edges or ends 26a is generally upright and serves as a thrust bearing or bearing surface that occasionally rotatably engages the side walls 36 and 38 of the rail 34. Preferably, hub 26 and socket 28 extend laterally outward of both sides of the outer load-supporting surface 22 as well as ribs 24, a sufficient amount or length to maintain adequate clearance between the outer load-supporting surface 22 and the top 40 of the rail 34 to prevent the roller 20 from rubbing against the top 40 of the rail.

It is believed that the construction and arrangement of the illustrative roller is less expensive and easier to mold within closer dimensional tolerances than some prior art rollers having connected axles, trunnions and spindles.

One of the many advantages of the present invention is the provision of a unitary one-piece rail frame assembly 32 that rigidly and rotatably supports the roller 20. The unitary rail frame assembly 32 includes an elongated generally channel-shaped rail frame 34 which is sometimes referred to as a "rail" or "track". In the preferred embodiment, the rail 34 generally has the configuration of an inverted U and is made of resilient steel or other resilient metal. Structurally, the rail 34 has a pair of generally parallel upright side walls 36 and 38 and a generally planar intermediate section 40 extending generally horizontally between and integrally connecting the side walls 36 and 38. In the preferred form, intermediate section 40 is positioned above the lateral axis 30 and provides the top of the rail 34.

Intermediate section 40 has a plurality of roller-receiving openings 42 which are longitudinally spaced apart from each other. Each roller-receiving opening 42 receives one of the rollers. Preferably, each roller-receiving opening 42 is generally rectangular in shape and has a longitudinal dimension perpendicular to the lateral axis 30 less than the maximum diameter of the outer cylindrical surface 22 and a size less than the maximum size of the roller 20 received in the opening 42 taken along an imaginary horizontal plane cut through the lateral axis 30 of that roller 20 as viewed in top plan view, but has a width greater than the roller 20, so that only the outer surface 22 and a portion of that roller 20 projects upwardly out of the roller-receiving opening 42 above the top 40 of the rail 34. This construction and arrangement permits the packages to roll upon the rollers 20 generally without rubbing against the rail 34.

Side walls 36 and 38 each have a U-shaped lower end or edge 44 with an upwardly turned flange or lip 46 that extends generally vertically towards the top 40 to provide additional reinforcement for the frame assembly 32. The upwardly turned flanges 46 of the side walls 36 and 38 are in general parallel relationship to each other and are of the same height.

In order to further reinforce the unitary frame assembly 32 and provide a gripping and engaging surface for a support frame or rack 16 or 18, each side wall 36 and 38 has a longitudinal reinforcing and stiffening rib 48 that is located closely adjacent to the lower end 44 of the rail 34, beneath the lateral axis 30. In the preferred form, the reinforcing ribs 48 of the side walls 36 and 38 are positioned in general horizontal alignment and parallel relationship to each other and extend laterally inwardly to form a longitudinal upright inner rib wall 50 generally about the vertical center line of the U-shaped lower end 44 and a longitudinal generally planar and upright grasping surface or outer rib wall 52 generally vertically aligned with the upright inner side wall surfaces 54.

In order to rotatably and securely support the rollers 20 in a manner which is relatively simple, inexpensive and easy to manufacture, assemble and install, the unitary rail frame assembly 32 includes pairs of arcuate shaft sections or pintles 56 and 58 that are spaced longitudinally along the rail 34. Each pair of arcuate shaft sections 56 and 58 extend integrally and laterally inwardly from the side walls 36 and 38, respectively, into a socket 28 of one of the rollers 20. Desirably, each pair of arcuate shaft sections 56 and 58 are positioned in general horizontal alignment and are axially spaced from each other to define an axial opening 60 therebetween.

Preferably, arcuate shaft sections 56 and 58 are tapered or slanted laterally inwardly in a downward direction from the lateral axis 30 towards an opposite side wall for ease of assembly. In the illustrative embodiment the unattached ends of the shaft sections 56 and 58 are tapered downwardly ½ degree from the lateral axis 30. It is believed that the downward taper also makes the shaft sections 56 and 58 easier to fabricate and provide high spots with minimum frictional surface area for quicker and smoother rotation of the roller 20.

Desirably, the innermost edge of the unattached ends of the shaft section 56 and 58 are curved or chamfered downwardly so as not to engage and interfere with rotation of the roller 20.

As shown in FIGS. 4 and 5, each shaft section 56 and 58 is preferably arcuately shaped or semi-tubular with a cross-sectional configuration of an inverted U or upstanding arch as viewed laterally, and has an outer surface 62 that faces upwardly to provide an upper bearing frame surface upon which the roller 20 can rotate. It is preferred that the shaft sections 56 and 58 each extend arcuately at a generally equal radius more than 180 degrees about the longitudinal axis 64 of its associated side wall 36 and 38 to provide adequate support for the roller 20. In the illustrative embodiment, the lower edges of each arcuate shaft section 56 and 58 extend about 30 degrees, respectively, below the longitudinal axis 64 so that each arcuate upper bearing surface 62 extends about 240 degrees.

For economy of material and manufacture, the shaft sections 56 and 58 formed from material blanked and bent out of the side walls 36 and 38. To this end, each side wall 36 and 38 has a series of specially configured side wall openings or apertures 66 which are longitudinally spaced apart from each other. Each opening 66 has a generally U-shaped lower portion 68 (FIG. 2) and an upper portion 70 that is generally "omega" or horseshoe-shaped.

The upper wall portion 72 (FIG. 3) immediately above and adjacent the arcuate shaft section 56 and 58 of each side wall 36 and 38 is in vertical alignment with the lower side wall portion 74 extending immediately beneath and adjacent the side wall openings 66. Preferably, upper and lower wall portions 72 and 74 are substantially planar or flat and are positioned in general coplanar relationship to each other.

In order to rigidly and firmly support the longitudinal ends of the rail 34 and roller assembly 14, an improved support fame 16 or 18 (FIGS. 2, 3 and 6–9) having front shelf or shelving members 75 or 76 (FIGS. 6 and 8) and rear shelf or shelving members 77 or 78 (FIGS. 7 and 9) is provided.

The front shelf member 75 in FIGS. 2 and 6 includes an upright support section 79 with a base or horizontal ledge portions 80 that engage and support the lower edges 44 of the rail 34 so as to firmly support the front ends 34f of roller assembly 14. Upright support section 79 has generally upright T-shaped end members 81 extending upwardly from the base or horizontal ledge portions 80. Each T-shaped member 81 has a pair of laterally spaced side portions 82 that are generally L-shaped and symmetrical and complementary to each other. Each side portion 82 has an upright edge 84 and a laterally extending gripping and rib-engaging foot 85. The adjacent upright edges 84 and feet 85 of adjacent T-shaped members 81 are positioned closely adjacent the outer side wall portions 44e of the lower edges 44 of the rail 34 and engage the grasping surfaces 52 of the longitudinal ribs 48, respectively, and are connected by and cooperate with a base or ledge portions 80 to define a pair of inverted T-shaped rail-receiving openings 83 for snugly receiving and engaging the side walls 36 and 38 of the rail 34. Feet 85 also serve to stabilize the positioning of the rail 34. In some circumstances it may be desirable that the upright edges 84 extend above the feet 85.

At the lateral ends of the support section 79 (FIG. 6) there are inverted L-shaped upright end members 81a. Each end member 81a has only one laterally extending foot 85a. Foot 85a faces laterally inward.

A generally horizontal bottom 86 (FIG. 6) is integrally connected to the upright support section 79. An inclined or sloped side 87 extends upwardly and rearwardly from the bottom 86. A generally upright head plate or abutment plate 88 depends downwardly from the upper edge portion or top of the inclined side 87 and is spaced forwardly of the upright support section 79. Abutment plate 88 serves as a stop or abutment surface for the rail 34 as well as the packages. Preferably, the corners formed at the junctions of the abutment plate 88, inclined side 87, bottom 86 and upright support section 79, respectively, are rounded to minimize concentration of stresses on the front shelf member 75.

The rear shelf member 77 in FIG. 7 is similar to the front shelf member 75, except that its side 187 is generally upright rather than inclined and is of a lesser overall height than the inclined side 87 (FIG. 6) of the front shelf member 75. The rear shelf member 77 is also squared off to have a generally flat or planar top 174, and the downwardly extending abutment plate or head plate 188 is spaced rearwardly of the upright support section 179 to engage the rearward end of the rail 34.

The upright support section 179 (FIG. 7) of the rear shelf member 77 is generally similar to the upright support section 79 (FIG. 6) of the front shelf member 75 and for ease of understanding and clarity, similar parts have been given similar numbers, but increased by 100, such as base 180, foot 185, etc. When installed, the upright support section 179 and head plate 188 of the rear shelf member 77 generally face the upright support section 79 (FIG. 69 and head plate 88, respectively, of the front shelf member 75.

The front shelf member 76 in FIG. 8 has an elongated generally horizontal base, bottom or base portion 89 which supportingly engages the lower edges 44 of the rail 34 to support the roller assembly 14. An inclined or sloped side 90 extends upwardly and rearwardly from the base 89. A generally upright head plate or abutment plate 91 depends downwardly from the upper edge portion or top of the inclined side 90. Abutment plate 91 serves as a stop or abutment surface for the packages. Longitudinal feet or shelf surfaces 92 extend generally horizontally and in a longitudinal direction from the lower portion or bottom of the abutment plate 91. Each foot 92 has a pair of laterally opposed longitudinal sides or upright edges 93. The unattached rearward edge of the longitudinal feet 92 are positioned forwardly of the rearward edge of the base 89. The adjacent upright edges 93 of adjacent feet 92 are connected by one of a plurality of lateral abutment portions 97 and engage the upright grasping surfaces 52 of the longitudinal ribs 48. Lateral abutment portions 97 are spaced rearwardly of the abutment plate 91 and serve as a stop or abutment surface for the front end 34f of the rail 34. Feet 92 also serve to stabilize the positioning of the shelf member 76.

The rear shelf member 78 in FIG. 9 is similar to the front shelf member 76 (FIG. 8) except that the side 190 is generally upright rather than inclined and has a height less than the overall height of the inclined side 90 (FIG. 8) of the front shelf member 76. The rear shelf member 78 is also squared off to provide a generally horizontal top 179 from which depends a downwardly extending abutment plate or head plate 191. The longitudinal feet 192 are substantially similar to the longitudinal feet 92 (FIG. 8) of the front shelf member 76 and the head plate 191 and feet 192 are spaced rearwardly of the front edge of the base 189. When installed, the head plates 191 and 91 of the rear and front shelf members 78 and 76 (FIGS. 9 and 8) generally face each other.

Preferably, the longitudinal ribs 48 snap fit into interlocking engagement with the feet 85 and 185 (FIGS. 2, 6 and 7) and 91 and 192 (FIGS. 3, 8 and 9). To this end the minimum distance between the grasping surfaces 52 of the roller assembly 14 (before engaging the support frames 16 and 18) should normally be slightly greater than the minimum distance between each of the adjacent rib-engaging feet 85, 185, 92 and 192.

In order to assemble the roller assembly 14 to the support frames 16 and 18 (FIGS. 2 and 3), the side walls 36 and 38 of the roller assembly 14 are temporarily compressed inwardly so that the minimum distance between the grasping surfaces 52 is less than normal minimum distance between the uncompressed grasping surfaces 52 and is less than the minimum lateral distance between engagement feet 85, 185, 92 and 192 of each shelf member 75–78, respectively. The roller assembly 14 is then inserted and positioned between the T-shaped end members 81 and 181 (FIGS. 2, 6 and 7) or longitudinal feet 92 and 192 (FIGS. 3, 8 and 9) so that the longitudinal ribs 48 are aligned with the feet 85 and 185 or 92 and 192, respectively. Upon releasing the side walls 36 and 38, the outer rib walls or grasping surfaces 52 will expand, snap-fittingly engage and be biased against the feet 85 and 185, or 92 and 192. Preferably, the lower ends or underside 44 of the roller assembly 14 is positioned upon the base 80, 180, 89 or 189 (FIGS. 6–9) and the front end of the rail 34 is positioned in abutting confrontation against the front abutment plate 88 (FIG. 6) or abutment portion 97 (FIG. 8) or closely adjacent thereto.

Figure 1:
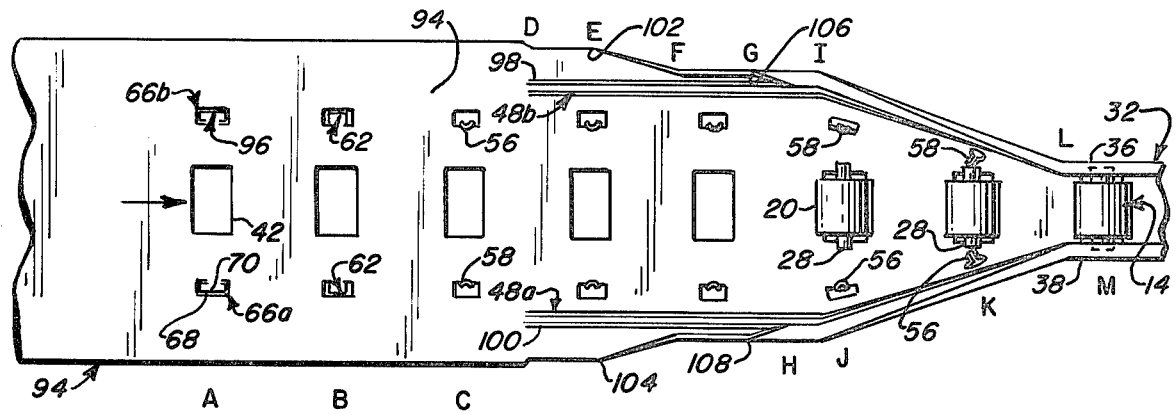
FIG. 1 is a schematic representation of a method of forming the inventive roller assembly.

While the roller assembly 14 can be made and manufactured by various means, a preferred method and process for making the roller assembly 14 is shown in FIG. 1.

In FIG. 1, a generally continuous imperforate web or sheet 94 of metal is provided in a generally planar or flat condition. Web 94 is sequentially, consecutively and systematically fed and advanced, left to right, as shown in FIG. 1, in a generally continuous manner through a series of processing or forming stations A-M to form the unitary rail frame assembly 32 and roller assembly 14 (FIGS. 2 and 3). During the forming process, the unitary rail frame assembly 32 and roller assembly 14 is formed and assembled, respectively, in an inverted or upside down state or condition and is subsequently installed right side up.

As the web 94 passes station A, web 94 is sequentially blanked or stamped to form longitudinally spaced sets of aligned openings, including roller-receiving openings 42 and laterally opposite pairs of side wall openings 66a and 66b in lateral alignment with the roller-receiving openings 42. Desirably, each of the roller-receiving openings 42 are rectangular in shape and have an area less than the maximum area of the roller 20 to be inserted in said opening 42 taken through the lateral axis 30 (FIG. 3) of the roller 20 as viewed in top and bottom plan views. In some circumstances it might be desirable that the roller-receiving openings 42 and the side wall openings 66a and 66b are blanked or stamped at different stations and times, rather than simultaneously at station A.

In order to provide integral shaft sections 56 and 58 (FIG. 3) integral with side walls 36 and 38, the side wall openings 66a and 66b are stamped or blanked without completely severing the blanked material 96 from the web 94. Specifically, U-shaped lower portions 68 of the side wall openings 66a and 66b are blanked and severed, while upper portions 70 remain in tact and unsevered.

At station B, the unsevered material 96 blanked from the side wall openings 66a and 66b are arcuately raised or bent to form the arcuate upper surfaces 62.

At station C, the arcuate surfaces 62 are bent or turned upwardly to form the arcuate shaft sections 56 and 58. Preferably, the arcuate surfaces 62 are bent at an angle slightly less than 90 degrees from the side wall defining portions of the web 94, such as about 89.5 degrees, to form the tapered axially spaced shaft sections 56 and 58 for ease of assembly and insertion into axial socket 28.

At station D web 94 is indented in an upward direction at two rib forming locations 98 and 100 to form a pair of generally parallel reinforcing and stiffening ribs 48a and 48b. Because some of the metal is pushed out of the plane of the web to form the ribs 48a and 48b at station D, the overall width of the web 94 is thereafter reduced.

At station E the outer lateral edges 102 and 104 of the web 94 are bent upwardly about 90 degrees in the beginning stages of a generally continuous roll forming process to form the end flanges 46 (FIG. 3). At station F the flanges 46 are completely bent and web 94 is advanced to station G.

At station G the unbent outer lateral edges 106 and 108 of the side wall defining portions of the web 94 are bent or turned outwardly about 90 degrees to form horizontal end portions or bights 110 (FIG. 3) and the generally U-shaped edges 44 of the side walls 36 and 38. At station H the edges 44 of the side walls 36 and 38 are completely formed and the web 94 is advanced to station I.

At station I the web 94 is preformed by partially turning or bending the web 94 to form semi-formed side walls 112 at about a 45 degree angle as shown in phantom or dotted line in FIG. 3.

At station J an impact-resistant roller 20, which has been previously molded or otherwise formed, is positioned and placed upon the web 94 with its axial socket 28 extending transversely or laterally in a direction towards the arcuate shaft sections 56 and 58. Preferably, the web 94 is being continuously roll formed at station J, although in some circumstances it may be desirable to stop roll forming at station J to permit placement of the roller 20 upon the web 94.

As the web 94 passes station K the side walls 36 and 38 are being turned and formed and the arcuate shaft sections 56 and 58 will begin entering the axial socket 28 of the roller 20 to form upper bearing surfaces 62 (FIGS. 4 and 5).

At station L, the side walls 36 and 38 are completely bent or turned upwardly, generally at right angles to the horizontal intermediate section 40 (FIGS. 2 and 3) of the rail 34.

At station M, the unitary rail assembly 32 is completely formed with the arcuate shaft sections 56 and 58 completely inserted into the axial socket 28 and engaging the hub 26 (FIG. 2) of the roller 20, with the shaft sections 56 and 58 in general axial alignment with each other. Thereafter, the web 94 can be cut or severed across its width at any desired length to provide a rail 34 (FIG. 2) with the desired number of rollers 20.

While the various steps required in the formation of the roller assembly 14 have been described as being carried out in a preferred order at separate stations, it may be desirable in some situations, to carry out these steps in a different order or to perform several of the operations simultaneously.

The preceding description has been given for ease of understanding only. No unnecessary limitations are to be understood therefrom as modifications will be obvious to those skilled in the art.

What is claimed is:

1. A roller assembly for use in a package flow system for conveying, supporting and storing a load such as packages, cartons, containers and other articles, upon a support frame, comprising:

a roller having an outer cylindrical load-supporting surface for engaging, dynamically supporting and conveying said load, said roller rotating about a lateral axis and defining shaft-receiving socket portions providing cylindrical bearing surfaces along said lateral axis; and a unitary one-piece rail frame assembly for rigidly and rotatably supporting said roller, said unitary one-piece rail frame assembly including an elongated generally channel-shaped frame having a pair of generally upright side walls and an intermediate section extending between and connecting said side walls; and said unitary one-piece rail frame assembly having a pair of generally stationary axially spaced shaft sections positioned in general alignment with each other generally along said lateral axis for insertion into said shaft-receiving socket portions of said roller to rotatably support and engage said cylindrical bearing surfaces of said roller, said axial spaced shaft sections, including a first shaft section extending integrally and laterally inwardly from one of said upright side walls of said channel-shaped frame and a second shaft section extending integrally and laterally inwardly from the other of said upright side walls of said channel-shaped frame in a direction generally towards said first shaft section, and each of said shaft sections having an outer surface extending integrally inwardly from the side walls of said channel-shaped frame with portions facing upwardly to provide an upper bearing frame surface upon which said roller can rotate.

2. A roller assembly in accordance with claim 1 wherein each of said shaft sections extending integrally inward from the side walls of said channel-shaped frame is arcuate in shape and each of said arcuate shaft sections has the cross-sectional shape of an inverted U and extends arcuately for more than 180 degrees.

3. A roller assembly in accordance with claim 2 wherein each of said arcuate shaft sections extends for about 240 degrees and are of a generally equal radius.

4. A roller assembly in accordance with claim 1 wherein:
each of said side walls of said channel-shaped frame has a generally upright inner side surface, and
each of said sidewalls of said channel-shaped frame has a reinforcing and stiffening rib disposed beneath said shaft sections, said reinforcing and stiffening rib extending laterally inwardly to form a longitudinal upright inner rib wall and a longitudinal upright grasping surface providing an outer rib wall positioned in general vertical alignment with one of said upright inner side surfaces of said side walls.

5. A roller assembly in accordance with claim 2 wherein:
said arcuate shaft sections are formed from material blanked and bent out of said side walls of said channel-shaped frame, and
said side walls each define an opening immediately beneath said shaft sections, said opening having a generally U-shaped lower portion and a generally omega-shaped upper portion.

6. A roller assembly in accordance with claim 5 wherein each of said side walls of said channel-shaped frame has generally planar wall portions in coplanar relationship to each other including an upper wall portion disposed immediately above and adjacent one of said arcuate shaft sections and a lower wall portion extending immediately beneath said opening in said side wall, and said upper and lower wall portions of said side wall are positioned in general vertical alignment with each other.

7. A roller assembly in accordance with claim 1 wherdin each of said shaft sections extending integrally inward from the side walls of said channel-shaped frame is tapered slightly inwardly in a downward direction from said lateral axis generally towards an opposite side wall.

8. A roller assembly for use in a package flow system, comprising:
a roller having an outer cylindrical load-supporting surface for dynamically supporting a load, a plurality of circumferentially spaced ribs extending radially inward from said cylindrical load-supporting surface, and a hub connected to said radial ribs, said roller rotating about a lateral axis and said hub defining an axial socket extending laterally along said lateral axis and laterally outward of said cylindrical load-supporting surface;
a unitary frame assembly for rotatably supporting said roller and including a generally channel-shaped frame having a pair of upright side walls and an intermediate section extending between and connecting said side walls, said intermediate section positioned above said lateral axis and defining a generally rectangular roller-receiving opening having a dimension perpendicular to said radial axis less than the diameter of the outer cylindrical load-supporting surface of the roller, and each of said side walls defining a longitudinal axis intersecting said lateral axis;
said unitary frame assembly including a pair of arcuate shaft sections in general horizontal alignment with each other along said lateral axis, including a first arcuate shaft section extending integrally and laterally inwardly from one of said upright side walls and a second arcuate shaft section extending integrally and laterally inwardly from the other of said upright side walls towards said first shaft section, for insertion into said axial socket to rotatably support said roller, said first and second arcuate shaft sections each having an outer surface facing generally upwardly to provide an upper bearing surface for the roller and said first and second arcuate shaft sections being axially spaced from each other to define an axial opening therebetween, each of said arcuate shaft sections having the shape of an inverted U and defining an upstanding arch as viewed laterally and said upper bearing surface extending greater than 180 degrees about said longitudinal axis.

9. A roller assembly in accordance with claim 8 wherein:
each of said side walls defines an opening beneath its associated arcuate shaft section and along said longitudinal axis, and
each of said side walls has generally planar wall portions positioned immediately adjacent said opening and said associated arcuate shaft section and said wall portions being in general vertical alignment with each other.

10. A roller assembly in accordance with claim 8 wherein each of said arcuate shaft sections is tapered slightly inwardly in a downward direction from said lateral axis.

11. A roller assembly in accordance with claim 8 wherein each of said side walls has a longitudinal rib extending laterally inwardly beneath said arcuate shaft sections.

12. A roller assembly in accordanc with claim 8 wherein each of said side walls has a generally U-shaped edge with an upwardly turned flange for providing additional reinforcement for said unitary frame assembly.

13. A roller assembly in accordance with claim 8 wherein said hub has lateral edges providing thrust bearings for rotatably engaging said side walls, and
said hub being of a length to maintain adequate clearance between said outer cylindrical load-supporting surface and said intermediate section to prevent said outer cylindrical load-supporting surface from rubbing against said intermediate section.

14. A roller assembly for use in a package flow system, comprising:
a plurality of rollers spaced longitudinally from each other;
each of said rollers having an outer cylindrical load-supporting surface for dynamically supporting a load, a plurality of circumferentially spaced ribs extending radially inward from said cylindrical load-supporting surface, and a hub connected to said radial ribs, said hub defining a lateral axis and an axial socket extending laterally along said lateral axis, and said axial socket extending laterally outward of said cylindrical load-supporting surface;

a unitary frame assembly for rotatably supporting said rollers and including a generally channel-shaped frame having a pair of upright side walls and an intermediate section extending between and connecting said side walls, said intermediate section positioned above said lateral axis and defining a plurality of generally rectangular roller-receiving openings spaced longitudinally from each other, each of said roller-receiving openings receiving one of said rollers and having a dimension perpendicular to said lateral axis that is less than the diameter of said outer cylindrical load-supporting surface of the roller received in said opening, each of said side walls defining a longitudinal axis intersecting said lateral axis and having a longitudinal reinforcing rib extending laterally inward and beneath said longitudinal axis, and each of said side walls having a generally U-shaped edge with an upwardly turned flange extending generally vertically towards said intermediate section;

said unitary frame assembly including pairs of arcuate shaft sections formed from said side walls and spaced longitudinally along said side walls for rotatably supporting said rollers;

each of said arcuate shaft sections being in general horizontal alignment with each other for insertion into the axial socket of one of said rollers and comprising a first arcuate shaft section extending integrally and laterally inwardly from one of said upright side walls and a second arcuate shaft section extending integrally and laterally inwardly from the other of said upright side walls towards said first shaft section, said first and second arcuate shaft sections each having an outer surface facing generally upwardly to provide an upper bearing frame surface for said roller and said first and second arcuate shaft sections being axially spaced from each other to define an axial opening therebetween, each arcuate shaft section having the shape of an inverted U and defining an upstanding arch as viewed laterally and being tapered slightly inwardly in a downward direction towards an opposite side wall, and said upper bearing surface extending greater than 180 degrees about said longitudinal axis;

each of said side walls defining a plurality of longitudinally spaced side wall openings, each side wall opening being positioned generally beneath one of said arcuate shaft sections and along said longitudinal axis; and each of said side walls having generally planar wall portions positioned immediately adjacent each of said side wall openings and said arcuate shaft sections, and said wall portions being in general coplanar relationship with each other.

15. A roller assembly in accordance with claim 14 wherein:

each arcuate shaft section is tapered about ½ degree downwardly from said lateral axis, and each of said shaft sections extend for about 240 degrees about said longitudinal axis.

* * * * *